United States Patent [19]

Dorsett

[11] Patent Number: 5,698,021
[45] Date of Patent: Dec. 16, 1997

[54] NON-SLIP FORMULATIONS

[75] Inventor: Leslie Dorsett, Clearwater, Fla.

[73] Assignee: Y-Slip Ltd., United Kingdom

[21] Appl. No.: 762,407

[22] Filed: Dec. 9, 1996

[51] Int. Cl.$^6$ ................................................ C09K 3/14
[52] U.S. Cl. ................ 106/36; 106/287.27; 106/287.32; 134/3; 134/40; 427/429; 510/109
[58] Field of Search ........................ 106/36, 287.28, 106/287.35, 287.27, 287.32; 252/79.2, 79.3; 134/3, 40; 427/429, 445; 510/109, 238, 239, 240

[56] References Cited

U.S. PATENT DOCUMENTS

| | | | |
|---|---|---|---|
| Re. 31,198 | 4/1983 | Binns | 134/3 |
| 3,107,188 | 10/1963 | Hancock. | |
| 3,318,742 | 5/1967 | Holton | 156/2 |
| 3,627,654 | 12/1971 | Petit. | |
| 3,847,688 | 11/1974 | Gillice | 156/2 |
| 3,867,218 | 2/1975 | Henry. | |
| 4,227,976 | 10/1980 | Menke. | |
| 4,738,876 | 4/1988 | George et al. | 427/299 |
| 4,897,213 | 1/1990 | Brink | 252/143 |
| 5,091,053 | 2/1992 | Blonder et al. | 156/657 |
| 5,100,500 | 3/1992 | Dastolifo et al. | 156/637 |
| 5,223,168 | 6/1993 | Holt | 134/40 |
| 5,423,910 | 6/1995 | Schiller | 106/36 |

*Primary Examiner*—Michael Marcheschi
*Attorney, Agent, or Firm*—Graham & James LLP

[57] ABSTRACT

The present invention relates to formulations and methods for preventing surfaces of natural or mineral materials or cementitious products from becoming slippery, especially when wet. The formulations comprise a non-fluorine-containing acid; a fluorine-containing compound, hydrogen sulfate or acetic acid; and a surfactant.

15 Claims, 1 Drawing Sheet

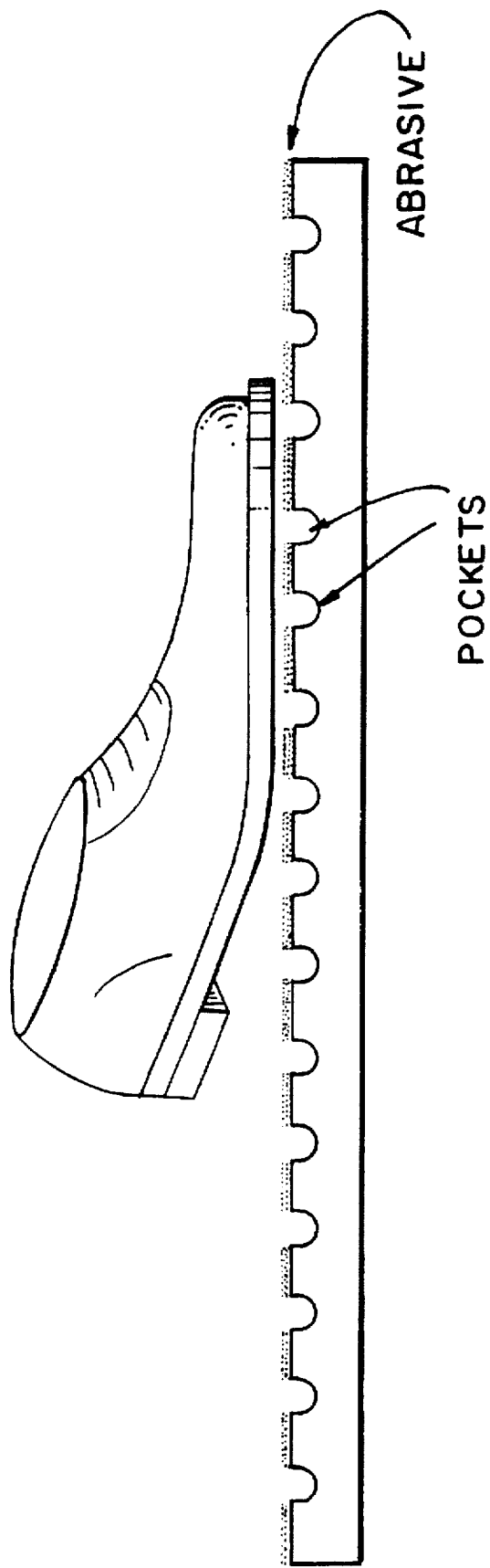

5,698,021

NON-SLIP FORMULATIONS

BACKGROUND OF THE INVENTION

This invention relates to formulations which prevent natural or mineral materials, or cementaceous products, from becoming slippery, especially when these materials or products get wet.

Many natural stone or mineral flooring materials, such as marble, granite, slate or flagstone, and many cementitious products, such as terrazzo, concrete, manufactured ceramic tile, glazed and unglazed tile, quarry tile, and porcelain are used abundantly in the construction of homes, office buildings, hospitals, nursing homes, hotels, motels, shopping malls, restaurants, schools, pool decks and the like. Many of these materials also find use, in, for example, bathrooms and porcelain fixtures such as bathtubs and shower stalls.

Many of these products are manufactured just within the nationally recognized guidelines for a safe, dry walking surface. According to OSHA regulations (see generally, 29 C.F.R. 1910.22), surfaces should have a coefficient of friction of at least 0.5. The Americans With Disabilities Act Guidelines suggest a coefficient of friction of 0.6 for horizontal surfaces and 0.7 for ramps and inclines. The Underwriters Laboratories classification for slip resistance is 0.5. These surfaces can become contaminated and fall below the safe level when dry. In addition, when the surfaces become wet, the friction can fall well below these same guidelines for a safe walking surface, thus creating a hazardous environment.

A number of methods have been attempted to overcome the problem of slipperiness encountered with the above materials and products. These methods include the use of abrasive adhesive tapes, topical coatings such as epoxies, acrylics, and paints containing an abrasive material such as sand or polystyrene pellets. These methods, however, are temporary, difficult to maintain and aesthetically unpleasant. Another method employed is to etch glazed surfaces. This method, however, removes the gloss of the glaze and is aesthetically unpleasant. In addition, by etching into the glazing, the porous undersurface is exposed, which can lead to discoloration and staining.

Another problem encountered in the prior art is that many of these methods are not effective on all of the types of surfaces identified above. Rather, many of the prior art methods are effective on either glazed or unglazed surfaces, but not both. This problem is further compounded when a surface is made up of a variety of materials, such as for design purposes.

Accordingly, there is a need for one multi-function formulation which will render multiple types of surfaces, including man-made glazed and unglazed file, natural stone or mineral flooring, marble, granite, slate and cementitious products such as terrazzo and concrete, and surfaces made up of combinations of these materials, slip resistant, especially when wet, submerged or contaminated.

In addition, there is a need for one multi-function formulation which is long-lasting on these surfaces.

There is a further need for one multi-function formulation which is aesthetically pleasing and does not significantly alter the visual appearance when applied to these surfaces.

OBJECTS OF THE INVENTION

It is an object of this invention to solve the unacceptably low friction problem which exists on all of the above types of surfaces.

It is another object of this invention to incorporate a process or method of application of this invention which is simple to use when directions are followed.

It is yet another object of this invention to enable persons at different levels of expertise to utilize this invention, including the professional applicator, janitorial-type personnel, and homeowners.

It is a further object of this invention to provide for a formulation which will increase the slip resistance on all of the above types of surfaces.

It is yet a further objective of this invention to provide for a single method or formulation which will solve the friction problem identified for the above surfaces which will not change the aesthetic appearance of those surfaces.

The above needs are met by the present invention, which is a combination of aqueous chemical solutions for the application onto multiple types of surfaces as follows: natural stone or mineral flooring materials, i.e., marble, granite, slate, flagstone; cementitious products, i.e., terrazzo, concrete, manufactured ceramic tile, glazed and unglazed tile, quarry tile and porcelain. The present invention renders these surfaces slip resistant when they are wet or contaminated. Preferably, the present invention can render these surfaces slip resistant when dry.

SUMMARY OF INVENTION

The present invention relates to formulations and methods for preventing surfaces of natural or mineral materials or cementitious products from becoming slippery, especially when wet. The invention comprises an aqueous solution comprising a non-fluorine-containing acid, a fluorine-containing compound and a surfactant. Alternatively, hydrogen sulfate or acetic acid can be used in place of the fluorine-containing compound. This solution can be prepared in concentrated form for dilution with water prior to use or in diluted form, ready to use. This solution is easily applied to a desired surface.

BRIEF DESCRIPTION OF THE DRAWING

FIG. 1 represents the effects of the claimed invention on a treated surface.

DETAILED DESCRIPTION OF THE INVENTION

The present invention is an aqueous solution comprising a first ingredient of a non-fluorine-containing acid; a second ingredient comprising a fluorine-containing compound, hydrogen sulfate or acetic acid; and a third ingredient comprising a surfactant. The first ingredient increases the coefficient of friction on unglazed surfaces, such as mineral surfaces and natural stone, marble, granite, slate, flagstone, as well as cementitious products such as terrazzo, quarry tile, unglazed tile and concrete. This ingredient comprises an acid with the proviso that the acid does not contain fluorine. The acid is preferably an inorganic acid, such as HCl $H_2SO_4$ and the like. Most preferably, this ingredient is HCl.

The second ingredient increases the coefficient of friction on glazed surfaces, such as ceramic, porcelain and glazed file. It comprises a fluorine-containing compound, hydrogen sulfate or acetic acid. Fluorine-containing compounds are preferably alkali bifluorides, such as sodium bifluoride, potassium bifluoride, lithium bifluoride and ammonium bifluoride.

The third ingredient is a surfactant. The surfactant acts as a wetting agent, a disbursing agent and to remove contaminants. Many surfactants can be used, so long as they do not neutralize the acids. The preferred surfactant is cocamidopropyl betaine (CAPB).

It is understood that these formulations may optionally contain dyes and fragrances. The use of these ingredients is known.

In the formulations of the present invention, the ingredient used for increasing the coefficient of friction on unglazed surfaces is separate from the ingredient used for increasing the coefficient of friction on glazed surfaces. Therefore, even though hydrogen sulfate and acetic acid which can be used on glazed surfaces are also acidic, the first ingredient should be a different acid.

The formulations of the present invention are acidic, and will therefore have a pH below 7. Preferably, the inventive formulations have a pH from about 1 to about 5 when they are applied to the surface to be treated.

The compositions of the present invention can be formulated by conventional means. The order of mixing is not critical to the functioning of the compositions. The normal precautions, however, should be taken when working with acids.

The inventive compositions can be prepared in concentrated from or in diluted, ready-to-use forms. If the inventive compositions are prepared in concentrated form, they can be diluted to the final desired volume with water prior to use.

The inventive formulations are easy to apply to a desired surface. They can be applied by spraying, mopping or sponging. Preferably, a uniform coating is applied to the surface to be treated.

It is not necessary to pre-treat the surface prior to applying the inventive formulations. Preferably, however, a pre-treating solution can be used. The preferred pre-treatment solution comprises a surfactant (preferably 2-propoxyethanol) and a base (preferably sodium hydroxide). In the alternative, 5 to 15% butyl cellusolve can be used.

The inventive formulations are applied to the desired surface, with or without pre-treatment, as described above, until an increase in friction is detected by, for example, pushing a foot across the surface. At this time, the inventive formulations have had the desired effect on the desired surface.

Once the desired effect has been achieved, formulae 1, 2 and 6–8, described below, should be removed from the surface. Preferably, removal is accomplished by using the same type of solution as the pre-treatment solution, discussed above. When using formula 3 below on a surface, this type of treatment is optional. With formulae 4 and 5 below, this type of treatment is not necessary. In any event, once the treatment is complete, one can wash the surface with water.

The changes which occur when this invention is applied to the surface of natural stone, marble, granite, slate, flagstone, cementitious products, terrazzo, quarry tile, unglazed tile and concrete are somewhat different than the changes that occur to a glazed surface of ceramic tile or porcelain.

On a glazed surface, the fluorine-containing compound, hydrogen sulfate or acetic acid of the aqueous solution attacks the glaze, exposing silica crystals. It also dissolves many soft portions of the glaze leaving hundreds or thousands of microscopic open pores or pockets per square inch on the surface. The exposed silica crystals (FIG. 1) create an increased abrasive friction on the surface when it is dry. When the surface becomes wet, the microscopic pores fill with the fluid. When the glazed surface is walked on, a vacuum is created within the pocket, thus increasing the static friction of the floor when wet. The glazed surface, however, is not penetrated. Therefore, the underlying porous material is not exposed and left unprotected.

On the surface of natural stone, marble, granite, slate, flagstone, and cementitious products such as terrazzo, quarry tile, unglazed tile and concrete, the surface may not contain silica. If the surface contains silica, the aqueous solution will expose the silica crystals, creating an increased friction when the surface is dry. If silica is not present, there will not be a notable change in friction when the surface is dry. These types of surfaces, however, are all mineral products which contain Alumina ($Al_2O_3$). The non-fluorine-containing acid of the aqueous solution dissolves this alma, thus leaving hundreds or thousands of microscopic pores or pockets on the surface where the alumina was prior to treatment. When the surface becomes wet the microscopic pores fill with the fluid. When the surface is walked on, a vacuum is created within the pockets, thus increasing the static friction of the floor when wet.

FIG. 1 illustrates the effect this invention has on the various types of surfaces it can be applied to. The abrasive surface increases the friction of the surface when it is wet or dry. The pockets or pores increase the friction of the surface when it is wet. FIG. 1 is schematic only, i.e., not to scale, because there are hundreds or thousands of pockets or pores per square inch when the instant invention is used.

PREFERRED FORMULAE

$NH_4HF_2$+HCl+CAPB

All formulae (1 through 8) are to be mixed with an amount of water necessary to make 1 gallon total product.
1. 21.0 fl. oz. - Hydrogen Chloride Solution (31–33% active)
0.476 lbs. - Ammonium Bifluoride (99% active)
2.1 fl. oz. - Cocamidopropyl Betaine
2. 15.75 fl. oz. - Hydrogen Chloride Solution (31–33% active)
0.357 lbs. - Ammonium Bifluoride (99% active)
1.575 fl. oz. - Cocamidopropyl Betaine
3. 10.50 fl. oz. - Hydrogen Chloride Solution (31–33% active)
0.238 lbs. - Ammonium Bifluoride (99% active)
1.050 fl. oz. - Cocamidopropyl Betaine
4. 5.250 fl. oz. - Hydrogen Chloride Solution (31–33% active)
0.119 lbs. - Ammonium Bifluoride (99% active)
0.525 fl. oz. - Cocamidopropyl Betaine
5. 2.625 fl. oz. - Hydrogen Chloride Solution (31–33% active)
0.060 lbs. - Ammonium Bifluoride
0.2625 fl. oz. - Cocamidopropyl Betaine The ammonium bifluoride may be substituted with .01–35 fluid ounces of a hydrogen sulfate solution, or with 10–52 fluid ounces of an acetic acid solution, as follows:

ALTERNATE FORMULAE

6. $NH_4HF_2$+HCl+$NH_2SO_4$
21.0 fl. oz. - Hydrogen Chloride Solution (31–33% active)
0.476 lbs. - Ammonium Bifluoride (99% active)
10.5 fl. oz. - Hydrogen Sulfate Solution (93.5% active)
2.1 fl. oz. - Cocamidopropyl Betaine
7. HCl+$H_2SO_4$
21.0 fl. oz. - Hydrogen Chloride Solution (31–33% active)
31.5 fl. oz. - Hydrogen Sulfate Solution (93.5% active)

2.1 fl. oz. - Cocamidopropyl Betaine
8. 1. HCl+CH₃COOH
21.0 fl. oz. - Hydrogen Chloride Solution (31–33% active)
26.0 fl. oz. - Acetic Acid Solution (99% active)
2.1 fl. oz. - Cocamidopropyl Betaine As presently envisioned, formula 3 above is the preferred formulation for commercial or industrial use and formulation 5 is the preferred formulation for home owner use.

Preferably, the inventive formulation is in a concentrated form for dilution prior to application. Most preferably, the inventive formulation is diluted to a volume of one gallon with water prior to use. Alternatively, the solutions can be provided in diluted, ready-to-use form.

In the most preferred use of the claimed invention, the surface is pre-treated and cleaned with a first aqueous solution of surfactant (2-propoxyethanol) and base (sodium hydroxide). This first aqueous solution is applied by mopping and then removed by mopping or extraction. The surfactant cleans the floor and removes grease and other contaminants. A residue of base remains on the surface and will react with the acids of the second aqueous solution.

After pretreatment and cleaning, the surface is then treated with a second aqueous solution, i.e., the inventive aqueous solution of formula 3 above. Prior to use, this formulation was diluted up to one gallon total volume with water. The second aqueous solution is applied by low pressure spraying. The residue of base left on the surface from the pre-treating and cleaning step helps to neutralize the acids of the second aqueous solution, slowing their aggressiveness and minimizing white salt deposits on the surface.

When an increase in friction is felt on the surface, such as for example by pushing a foot across the surface, the first aqueous solution is again applied to the surface. This application can be performed by mopping. This application neutralizes remaining acids from the application of the second aqueous solution and removes any residues of white salts left by the reactions of acids with silicates. The first aqueous solution is then removed by mopping or extraction. The floor is then rinsed with clean water and damp mopped.

The resulting surface is now slip resistant.

TEST DATA

Tests were performed by SGS U.S. Testing Co. Inc., New Jersey.

PROCEDURE

Static Coefficient of Friction

Three types of ceramic tiles, smooth gloss finish, smooth matte finish and rough matte finish, quarry tiles and polished porcelain tiles were used in the antislip treatment evaluation. Three 12 by 12 inch tiles of each (quarry tiles were 10" by 10") were treated with the antislip product according to client's directions.

Both the treated tiles and three each of untreated tiles were tested for static coefficient of friction according to ASTM D-2047 using the James machine. A neoprene foot was used to simulate bare feet. All of the samples were tested wet. Additionally, the smooth matte ceramic was tested dry and the untreated porcelain was tested dry.

The product was also applied to other ceramic tiles with various decorative patterns and finishes to determine any visual deleterious effects on the tiles or finishes.

Use Application

The tiles were pre-treated with a Neutralizer Cleaner (surfactant (2-propoxyethanol) and base (sodium hydroxide)) momentarily and then rinsed off with tap water. Then, a one to one dilution (per client's instructions) (i.e., the composition of formula 3 diluted to 1 gallon with water) of the product was sponged on to each tile and allowed to sit until a difference in friction was noticed by the operator when robbing a latex gloved finger against the surface. The Neutralizer Cleaner (surfactant (2-propoxyethanol) and base (sodium hydroxide)) (1:4 dilution per client's instructions) was then applied allowed to sit for one minute and rinsed off with tap water.

RESULTS

| Sample | Condition | Specimen | Determination | Static Coefficient Of Friction |
|---|---|---|---|---|
| Smooth Matte Untreated | Wet | 1 | 1 | 0.39 |
| | | | 2 | 0.27 |
| | | | 3 | 0.24 |
| | | | 4 | 0.24 |
| | | 2 | 1 | 0.18 |
| | | | 2 | 0.17 |
| | | | 3 | 0.10 |
| | | | 4 | 0.15 |
| | | 3 | 1 | 0.30 |
| | | | 2 | 0.18 |
| | | | 3 | 0.18 |
| | | | 4 | 0.15 |
| | | | Sample Average | 0.21 |
| Smooth Matte Treated | Wet | 1 | 1 | 0.57 |
| | | | 2 | 0.46 |
| | | | 3 | 0.46 |
| | | | 4 | 0.48 |
| | | 2 | 1 | 0.60 |
| | | | 2 | 0.68 |
| | | | 3 | 0.80 |
| | | | 4 | 0.60 |
| | | 3 | 1 | 1.00 |
| | | | 2 | 1.00 |
| | | | 3 | 0.88 |
| | | | 4 | 1.02 |
| | | | Sample Average | 0.71 |
| Rough Matte Untreated | Wet | 1 | 1 | 0.31 |
| | | | 2 | 0.21 |
| | | | 3 | 0.27 |
| | | | 4 | 0.24 |
| | | 2 | 1 | 0.47 |
| | | | 2 | 0.30 |
| | | | 3 | 0.28 |
| | | | 4 | 0.25 |
| | | 3 | 1 | 0.48 |
| | | | 2 | 0.37 |
| | | | 3 | 0.32 |
| | | | 4 | 0.45 |
| | | | Sample Average | 0.33 |
| Rough Matte Treated | Wet | 1 | 1 | 0.93 |
| | | | 2 | 0.59 |
| | | | 3 | 0.54 |
| | | | 4 | 0.60 |
| | | 2 | 1 | >1.20 |
| | | | 2 | 0.90 |
| | | | 3 | 1.20 |
| | | | 4 | 0.85 |
| | | 3 | 1 | 0.60 |
| | | | 2 | 0.58 |
| | | | 3 | 0.62 |
| | | | 4 | .62 |
| | | | Sample Average | 0.79 |
| Smooth Gloss Untreated | Wet | 1 | 1 | 0.08 |
| | | | 2 | 0.06 |
| | | | 3 | 0.12 |
| | | | 4 | 0.08 |
| | | 2 | 1 | 0.13 |
| | | | 2 | 0.08 |
| | | | 3 | 0.09 |
| | | | 4 | 0.12 |
| | | 3 | 1 | 0.10 |

| Sample | Condition | Specimen | Determination | Static Coefficient Of Friction |
|---|---|---|---|---|
| | | | 2 | 0.09 |
| | | | 3 | 0.21 |
| | | | 4 | 0.13 |
| | | | Sample Average | 0.11 |
| Smooth Gloss Treated | Wet | 1 | 1 | 0.37 |
| | | | 2 | 0.52 |
| | | | 3 | 0.47 |
| | | | 4 | 0.51 |
| | | 2 | 1 | 0.60 |
| | | | 2 | 0.51 |
| | | | 3 | 0.50 |
| | | | 4 | 0.70 |
| | | 3 | 1 | 0.75 |
| | | | 2 | 0.66 |
| | | | 3 | 0.85 |
| | | | 4 | 0.75 |
| | | | Sample Average | 0.60 |
| Quarry Untreated | Wet | 1 | 1 | 1.12 |
| | | | 2 | >1.20 |
| | | | 3 | 1.10 |
| | | | 4 | 0.95 |
| | | 2 | 1 | >1.20 |
| | | | 2 | 1.00 |
| | | | 3 | >1.20 |
| | | | 4 | >1.20 |
| | | 3 | 1 | >1.20 |
| | | | 2 | >1.20 |
| | | | 3 | >1.20 |
| | | | 4 | >1.20 |
| | | | Sample Average | >1.15 |
| Quarry Treated | Wet | 1 | 1 | 1.01 |
| | | | 2 | >1.20 |
| | | | 3 | 0.95 |
| | | | 4 | 1.15 |
| | | 2 | 1 | >1.20 |
| | | | 2 | >1.20 |
| | | | 3 | >1.20 |
| | | | 4 | >1.20 |
| | | 3 | 1 | >1.20 |
| | | | 2 | >1.20 |
| | | | 3 | >1.20 |
| | | | 4 | >1.20 |
| | | | Sample Average | 1.16 |
| Porcelain Untreated | Wet | 1 | 1 | 0.14 |
| | | | 2 | 0.14 |
| | | | 3 | 0.16 |
| | | | 4 | 0.14 |
| | | 2 | 1 | 0.14 |
| | | | 2 | 0.13 |
| | | | 3 | 0.22 |
| | | | 4 | 0.08 |
| | | 3 | 1 | 0.21 |
| | | | 2 | 0.13 |
| | | | 3 | 0.15 |
| | | | 4 | 0.21 |
| | | | Sample Average | 0.15 |
| Porcelain Treated | Wet | 1 | 1 | >1.20 |
| | | | 2 | 1.04 |
| | | | 3 | 0.77 |
| | | | 4 | 0.81 |
| | | 2 | 1 | 1.09 |
| | | | 2 | 1.13 |
| | | | 3 | 0.81 |
| | | | 4 | 1.01 |
| | | 3 | 1 | 1.12 |
| | | | 2 | 1.00 |
| | | | 3 | 0.82 |
| | | | 4 | 0.91 |
| | | | Sample Average | >0.98 |
| Concrete Untreated | Wet | 1 | 1 | >1.20 |
| | | | 2 | 1.15 |
| | | | 3 | 1.10 |
| | | | 4 | >1.20 |
| | | 2 | 1 | >1.20 |
| | | | 2 | >1.20 |
| | | | 3 | 1.13 |
| | | | 4 | >1.20 |
| | | 3 | 1 | 1.02 |
| | | | 2 | 1.10 |
| | | | 3 | 1.00 |
| | | | 4 | >1.20 |
| | | | Sample Average | >1.16 |
| Porcelain Untreated | Dry | 1 | 1 | >1.20 |
| | | | 2 | >1.20 |
| | | | 3 | >1.20 |
| | | | 4 | >1.20 |
| | | 2 | 1 | >1.20 |
| | | | 2 | >1.20 |
| | | | 3 | >1.20 |
| | | | 4 | >1.20 |
| | | 3 | 1 | >1.20 |
| | | | 2 | >1.20 |
| | | | 3 | >1.20 |
| | | | 4 | >1.20 |
| | | | Sample Average | >1.20 |
| Smooth Matte Untreated | Dry | 1 | 1 | >1.20 |
| | | | 2 | >1.20 |
| | | | 3 | >1.20 |
| | | | 4 | >1.20 |
| | | 2 | 1 | >1.20 |
| | | | 2 | >1.20 |
| | | | 3 | >1.20 |
| | | | 4 | >1.20 |
| | | 3 | 1 | >1.20 |
| | | | 2 | >1.20 |
| | | | 3 | >1.20 |
| | | | 4 | >1.20 |
| | | | Sample Average | >1.20 |
| Smooth Matte Treated | Dry | 1 | 1 | >1.20 |
| | | | 2 | >1.20 |
| | | | 3 | >1.20 |
| | | | 4 | >1.20 |
| | | 2 | 1 | >1.20 |
| | | | 2 | >1.20 |
| | | | 3 | >1.20 |
| | | | 4 | >1.20 |
| | | 3 | 1 | >1.20 |
| | | | 2 | >1.20 |
| | | | 3 | >1.20 |
| | | | 4 | >1.20 |
| | | | Sample Average | >1.20 |

Ease of Application and Visual Deleterious Effects

During application the approximate contact time to achieve a change in friction was noted. At a 1:1 dilution (as used) approximately three minutes yielded satisfactory results. After rinsing and drying the treated tiles were compared to untreated tiles and inspected for textural differences in feel and visual changes such as loss of gloss or pattern. The tiles tested did not exhibit significant visual changes or noticeable roughening of the surface. When treated and untreated tiles were placed side by side, SGS U.S. Testing Co. reported that there was a discernable difference in gloss especially when viewing at a side angle. This difference, however, was detected when the treated and untreated files were held up to a light and viewed at a 45° angle. The difference is not as apparent with straight on viewing. This was more evident with the smoother higher gloss tiles than with the rougher textured tiles. One tile that was tested for application only had a raised pattern which developed an iridescence after treatment. There was a discernible change in feel with an increase in friction.

The above results demonstrate that when the coefficient of friction or untreated surfaces drops to unacceptably low levels when the surface gets wet, the inventive formulations dramatically increase the coefficient of friction. On the other hand, if a surface, such as the untreated quarry tested above, maintains a high coefficient of friction when wet, treating that surface with the inventive formulations will not adversely affect that result, such as for example by elevating the coefficient of friction to an unacceptable level. Finally, the effect on the visual appearance of the surface is minimal.

While the invention has been described in connection with specific embodiments thereof, it is clearly to be understood that this is done only by way of example and not as a limitation to the scope of the invention as set forth in the objects thereof and in the appended claims.

What is claimed is:

1. A formulation useful for increasing coefficient of friction on surfaces of natural stone, mineral materials or cementitious products which comprises:
   a. a non-fluorine-containing acid which dissolves alumina;
   b. a fluorine-containing compound, hydrogen sulfate or acetic acid; and
   c. from 0.2625 fl. oz. to 2.1 fl. oz. of a surfactant.

2. The formulation of claim 1 wherein the non-fluorine-containing acid is an inorganic acid.

3. The formulation of claim 2 wherein the non-fluorine-containing inorganic acid is HCl.

4. The formulation of claim 1 wherein the fluorine-containing compound is an alkali bifluoride.

5. The formulation of claim 1 wherein the fluorine-containing compound is selected from the group consisting of sodium bifluoride, potassium bifluoride, lithium bifluoride and ammonium bifluoride.

6. The formulation of claim 5 wherein the fluorine-containing compound is ammonium bifluoride.

7. A formulation useful for increasing coefficient of friction on surfaces of natural stone, mineral materials or cementitious products which comprises:
   a. from about 2.625 fl. oz. to about 21.0 fl. oz. of a 31 to 33% active solution of hydrochloric acid;
   b. from about 0.060 lbs to about 0.476 lbs ammonium bifluoride optionally mixed with about 10.5 fl. oz. hydrogen sulfate, from about 10 fl. oz. to about 52 fl. oz. acetic acid or about 0.1 fl. oz. to about 35 fl. oz. hydrogen sulfate; and
   c. from about 0.2625 fl. oz. to about 2.1 fl. oz. cocamidopropyl betaine.

8. A method of increasing coefficient of friction on surfaces of natural stone, mineral materials or cementitious products which comprises:
   a. applying to said surfaces a formulation comprising:
      i. a non-fluorine-containing acid which dissolves alumina;
      ii. a fluorine-containing compound, hydrogen sulfate or acetic acid; and
      iii. from 0.2625 fl. oz. to 2.1 fl. oz. of a surfactant;
   b. testing for an increase in the coefficient of friction on said surface;
   c. optionally neutralizing the formulation; and
   d. removing said formulation from the surface by washing said surface with water.

9. The method of claim 8 wherein the non-fluorine-containing acid is an inorganic acid.

10. The method of claim 9 wherein the non-fluorine-containing inorganic acid is HCl.

11. The method of claim 8 wherein the fluorine-containing compound is an alkali bifluoride.

12. The method of claim 8 wherein the fluorine-containing compound is selected from the group consisting of sodium bifluoride, potassium bifluoride, lithium bifluoride and ammonium bifluoride.

13. The method of claim 12 wherein the fluorine-containing compound is ammonium bifluoride.

14. A method of increasing coefficient of friction on surfaces of natural stone, mineral materials or cementitious products which comprises applying to said surfaces a formulation of claim 7.

15. The method of claim 14 wherein once the coefficient of friction is increased, the acid in the formulation is neutralized and the formulation is then removed from the surface by washing the surface with water.

* * * * *